United States Patent
Choi et al.

(10) Patent No.: US 10,736,223 B2
(45) Date of Patent: Aug. 4, 2020

(54) METHOD AND APPARATUS FOR ATTACHING DISPLAY DEVICE TO EXTERIOR MEMBER IN AN ELECTRONIC DEVICE

(71) Applicant: SAMSUNG ELECTRONICS CO., LTD., Suwon-si, Gyeonggi-do (KR)

(72) Inventors: Jin-Chul Choi, Yongin-si (KR); Ha-Youl Jung, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/529,000

(22) Filed: Aug. 1, 2019

(65) Prior Publication Data

US 2019/0357370 A1    Nov. 21, 2019

Related U.S. Application Data

(63) Continuation of application No. 15/340,299, filed on Nov. 1, 2016, now Pat. No. 10,390,442.

(30) Foreign Application Priority Data

Nov. 3, 2015  (KR) .......................... 10-2015-0154029

(51) Int. Cl.
*H05K 5/00* (2006.01)
*F16M 11/00* (2006.01)
*G06F 1/16* (2006.01)

(52) U.S. Cl.
CPC .......... *H05K 5/0017* (2013.01); *F16M 11/00* (2013.01); *G06F 1/1652* (2013.01)

(58) Field of Classification Search
CPC .... G06F 1/1607; H05K 5/0017; F16M 11/00; F16M 11/041; B23P 19/02
See application file for complete search history.

(56) References Cited

U.S. PATENT DOCUMENTS

| | | | | |
|---|---|---|---|---|
| 6,144,550 A | * | 11/2000 | Weber | G06F 1/1613 345/903 |
| 2004/0003527 A1 | | 1/2004 | Suen | |
| 2006/0038745 A1 | | 2/2006 | Naksen | |
| 2009/0107020 A1 | * | 4/2009 | Aires | G09F 7/00 40/610 |
| 2011/0193829 A1 | * | 8/2011 | Tsai | G02F 1/133305 345/204 |

(Continued)

FOREIGN PATENT DOCUMENTS

KR    10-2015-0009054    1/2005

OTHER PUBLICATIONS

U.S. Appl. No. 15/340,299, filed Nov. 1, 2016; Choi et al.

*Primary Examiner* — Daniel P Wicklund
*Assistant Examiner* — Sagar Shrestha
(74) *Attorney, Agent, or Firm* — Nixon & Vanderyhe P.C.

(57) ABSTRACT

A method and apparatus for attaching a display device to an exterior member in an electronic device are provided. The method includes arranging a tube to be at least partially surrounded by a foldable flexible display device, arranging the flexible display device to be at least partially surrounded by the exterior member, the flexible display device and the exterior member being folded, and inflating the tube by injecting gas into the tube. The flexible display device is attached to inner surfaces of the exterior member by the inflation of the tube.

7 Claims, 5 Drawing Sheets

(56) References Cited

U.S. PATENT DOCUMENTS

| | | | |
|---|---|---|---|
| 2011/0279961 A1* | 11/2011 | Shedletsky | H05K 7/06 313/584 |
| 2012/0019482 A1 | 1/2012 | Wang | |
| 2013/0107425 A1 | 5/2013 | Wright | |
| 2013/0307408 A1* | 11/2013 | Hirakawa | H05K 7/06 313/584 |
| 2013/0308250 A1 | 11/2013 | Chiu | |
| 2014/0290104 A1 | 10/2014 | Lindblom | |
| 2014/0362511 A1 | 12/2014 | Deutsch | |
| 2016/0334836 A1 | 11/2016 | Hong | |

* cited by examiner

METHOD AND APPARATUS FOR ATTACHING DISPLAY DEVICE TO EXTERIOR MEMBER IN AN ELECTRONIC DEVICE

CROSS-REFERENCE TO RELATED APPLICATION

This application is a Continuation of U.S. application Ser. No. 15/340,299, filed Nov. 1, 2016, which claims priority to KR 10-2015-0154029, filed Nov. 3, 2015, the entire contents of each of which are all hereby incorporated herein by reference.

TECHNICAL FIELD

The present disclosure relates generally to a method and apparatus for attaching a display device to an exterior member in an electronic device.

BACKGROUND

An electronic device refers to a device that executes a specific function according to a loaded program, such as a home appliance, an electronic note, a portable multimedia player (PMP), a mobile communication terminal, a tablet personal computer (PC), a video/audio player, a desk top/laptop computer, and a vehicle navigator. For example, such an electronic device may output stored information visually or audibly. Along with the increased integration level and the increased popularity of ultra-high-rate, large-capacity wireless communication of electronic devices, many functions have recently been loaded in a single mobile communication terminal. For example, an entertainment function such as gaming, a multimedia function such as music/video play, a communication and security function such as mobile banking, scheduling, an electronic wallet function, and so on as well as a communication function are incorporated in one electronic device.

In general, a portable electronic device such as an electronic note, a PMP, a mobile communication terminal, or a tablet PC is equipped with a display device and a battery, and has a bar-type, a folder-type, or a sliding-type exterior. As electronic devices have been miniaturized owing to the development of electronics and communication technology, an electronic device wearable around a body part like a wrist or the head has been commercialized.

Along with the proliferation of electronic devices, the outward looks of electronic devices become improved to be differentiated from others, thus satisfying various user demands. The exterior of such an electronic device is fabricated of plastic or metal which is readily processed. To render the exterior of the electronic device to be sophisticated, it may be formed of glass. The glass exterior of the electronic device may be shaped three-dimensionally and configured as a housing or a part of the housing in the electronic device.

In general, the exterior of a commercialized electronic device may be attached to a display device by pressure. However, in the case where the three-dimensional glass exterior is formed as a part of the housing of the electronic device, a method for attaching the display device to an inner surface of the exterior by pressing the display device is yet to be specified.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide a method and apparatus for attaching a display device to a three-dimensional exterior of an electronic device.

In accordance with an aspect of the present disclosure, a method for attaching a display device to an exterior member in an electronic device is provided. The method includes arranging a tube to be at least partially surrounded by a foldable flexible display device, arranging the flexible display device to be at least partially surrounded by an exterior member, the flexible display device and the exterior member being folded, and inflating the tube by injecting a gas into the tube. The flexible display device is attached to inner surfaces of the exterior member by the inflation of the tube.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features and advantages of the disclosure will be more apparent from the following detailed description, taken in conjunction with the accompanying drawings, in which like reference numerals refer to like elements, and wherein.

Throughout the drawings, like reference numerals will be understood to refer to like parts, components, and structures.

DETAILED DESCRIPTION

Figure 1:
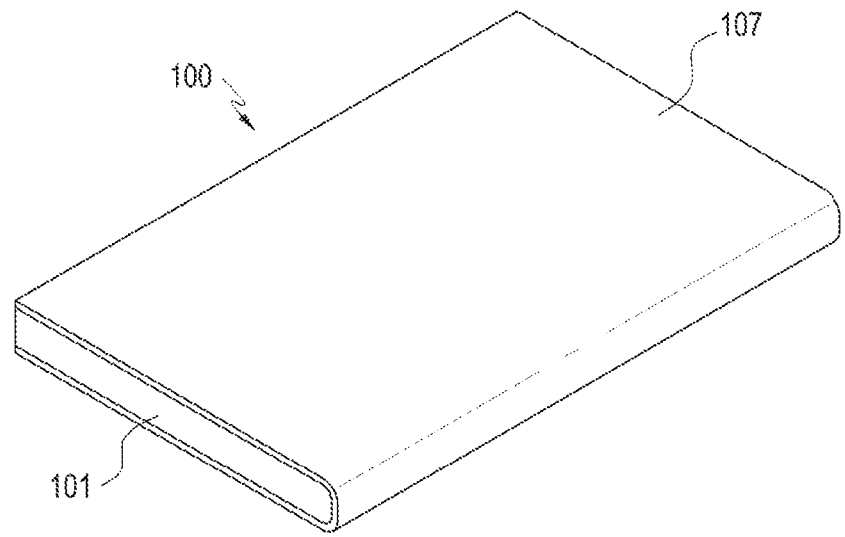
FIG. 1 is a perspective view illustrating an example electronic device according to various example embodiments of the present disclosure.

Various example embodiments of the present disclosure are described with reference to the accompanying drawings. However, the scope of the present disclosure is not intended to be limited to the particular embodiments and it is to be understood that the present disclosure covers all modifications, equivalents, and/or alternatives falling within the scope and spirit of the present disclosure. In relation to a description of the drawings, like reference numerals denote the same components.

In the present disclosure, the term 'have', 'may have', 'include', or 'may include' signifies the presence of a specific feature (for example, number, function, operation, or component such as part), not excluding the presence of one or more other features.

In present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the operations.

The terms as used in the present disclosure are provided to describe merely example embodiments, not intended to limit the scope of other embodiments. It is to be understood that singular forms include plural referents unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

According to various embodiments of the present disclosure, an electronic device may include a touch panel. The term 'electronic device' may be interchangeably used with the term 'terminal', 'portable terminal', 'mobile terminal', 'communication terminal', 'portable communication terminal', 'display device', or the like.

For example, the electronic device may be any of a smartphone, a portable phone, a navigator, a game console, a TV, an in-vehicle head unit, a laptop computer, a tablet computer, a portable media player (PMP), and a personal digital assistant (PDA), or the like, but is not limited thereto. The electronic device may be implemented as a pocket-size portable communication terminal with wireless communication functionality.

The electronic device may perform a task by communicating or interacting with an external electronic device such as a server. For example, the electronic device may transmit an image captured by a camera and/or location information detected by a sensor unit to the server through a network. The network may be any of, but not limited to, a mobile or cellular communication network, a local area network (LAN), a wireless LAN (WLAN), a wide area network (WAN), the Internet, and a small area network (SAN).

FIG. 1 is a perspective view illustrating an example electronic device according to various example embodiments of the present disclosure.

Referring to FIG. 1, an electronic device 100 according to various example embodiments of the present disclosure may include a housing 101 and an exterior member 107.

Various input/output (I/O) devices such as a main home key and a receiver, and various sensors such as a proximity light sensor may be arranged in the housing 101. The housing 101 may be fabricated of a metal, and a part of the housing 101 (for example, the edges of the housing 101) may be formed of a metal, to thereby serve as an antenna radiator. Further, a circuit board may be provided inside the housing 101. A controller, a storage, a communication circuit, and so on required to operate the electronic device 100 may be mounted on the circuit board.

The exterior member 107 may be provided on the front, side, and rear surfaces of the housing 101, and form the exterior of the electronic device 100, together with the housing 101. The exterior member 107 may transmit a screen output from a display device attached on an inner surface of the exterior member 107, while protecting the display device. The exterior member 107 may be integrated with a touch panel, and thus may be implemented as a virtual keypad, for example, a touch screen, together with the display device.

Figure 2:
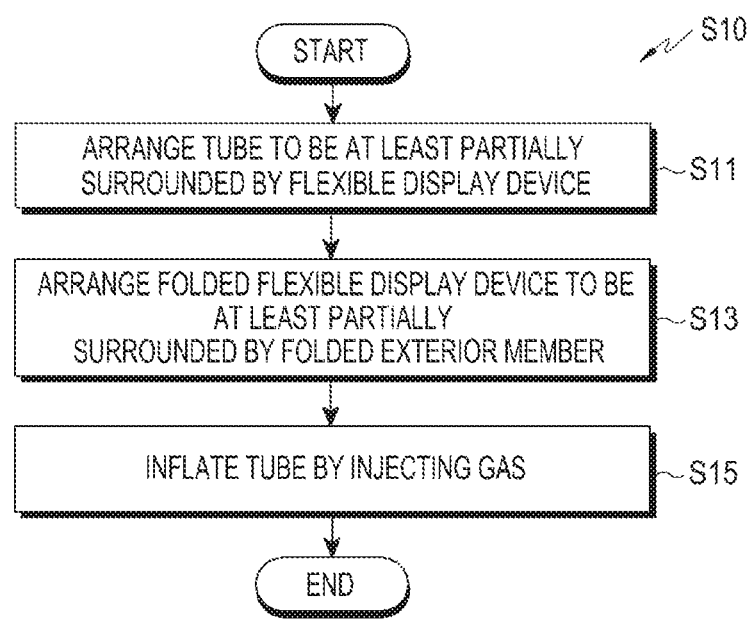
FIG. 2 is a flowchart illustrating an example method for attaching a flexible display device to an exterior member in an electronic device according to various example embodiments of the present disclosure.

FIG. 2 is a flowchart illustrating an example method for attaching a flexible display device to an exterior member in an electronic device according to various example embodiments of the present disclosure.

Referring to FIG. 2, a method S10 for attaching a flexible display device to an exterior member in an electronic device according to one of various example embodiments of the present disclosure may include an operation S11 for arranging a tube so that at least a part of the tube may be surrounded by the flexible display device, an operation S13 for arranging the flexible display device which is folded, so that at least a part of the folded flexible display device may be surrounded by the exterior member which is folded, and an operation S15 for inflating the tube by injecting gas. Thus, the flexible display device may be attached to inner surfaces of the exterior member by the inflation of the tube.

With reference to FIGS. 3 to 9, a method and apparatus for attaching a display device to an exterior member in an electronic device according to various example embodiments of the present disclosure will be described below.

Before a description of the operation S11 for arranging the tube so that at least a part of the tube may be surrounded by the flexible display device, a degree to which the flexible display device is folded will first be described.

Figure 3:
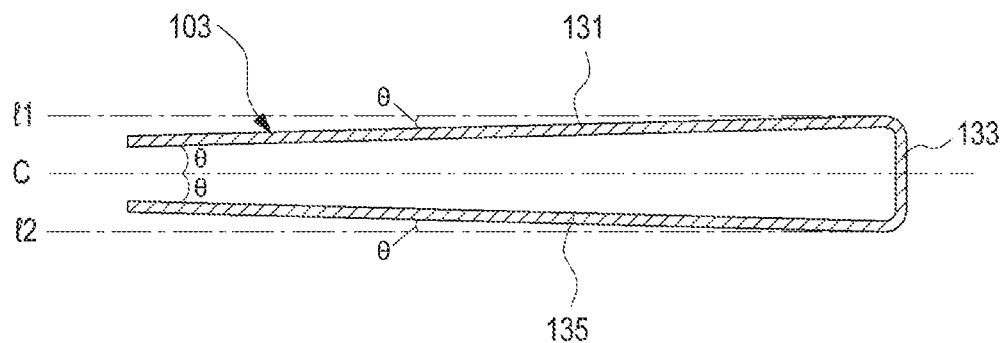
FIG. 3 is a sectional view illustrating an example flexible display device in an electronic device according to one of various example embodiments of the present disclosure.

FIG. 3 is a sectional view illustrating an example flexible display device in an electronic device according to one of various example embodiments of the present disclosure.

Referring to FIG. 3, a flexible display device 103 may be formed of a flexible material, and may include a first flexible display 131 corresponding to one of the front and rear surfaces of the exterior member (107 in FIG. 1), a second flexible display 133 corresponding to a side surface of the exterior member (107 in FIG. 1), and a third flexible display 135 corresponding to the other of the front and rear surfaces of the exterior member (107 in FIG. 1).

The first flexible display 131 and the third flexible display 135 may be folded with respect to the second flexible display 133. For example, the first flexible display 131 and the third flexible display 135 may be folded from both ends of the second flexible display 133, at acute angles to directions 11 and 12 perpendicular to the length direction of the second flexible display 133. That is, the first flexible display 131 and the third flexible display 135 may be inclined at an acute angle θ to a center line C passing through the center of the flexible display device 103. The thus-configured flexible display device 103 may prevent the first and third flexible displays 131 and 135 from being prematurely attached to the exterior member on which an adhesive is coated in the process of arranging the flexible display device 103 between inner surfaces of the folded exterior member. That is, the thus-configured flexible display device 103 may prevent the first and third flexible displays 131 and 135 from being attached to inner surfaces of the exterior member (107 in FIG. 1) until before the second flexible display 133 approaches close to an inner side surface of the exterior member (107 in FIG. 1).

Figure 4:
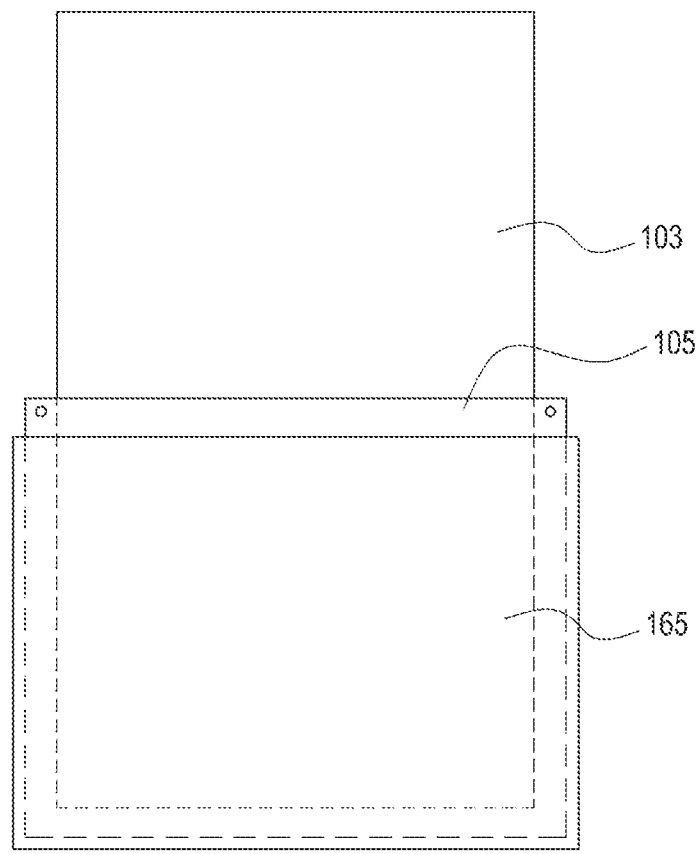
FIG. 4 is a sectional view illustrating an example tube and tube housing mounted on an unfolded flexible display device, the tube and the tube housing forming an apparatus for attaching the flexible display device to an exterior member, in an electronic device according to one of various example embodiments of the present disclosure.

FIG. 4 is a sectional view illustrating an example tube and tube housing mounted on an unfolded flexible display device, the tube and the tube housing forming an apparatus for attaching the flexible display device to an exterior member, in an electronic device according to one of various example embodiments of the present disclosure.

Referring to FIG. 4, the operation S11 for arranging a tube 105 so that at least a part of the tube 105 may be at least partially surrounded by the flexible display device 103 may include an operation for mounting the tube 105 on the flexible display device 103 which is unfolded.

The tube 105 may be inflated by injecting gas into it. The tube 105 may be formed of rubber. However, the material of the tube 105 is not limited to rubber. Rather, the tube 105 may be formed of any other material which can be inflated by gas injection.

The attachment method (S10 in FIG. 2) may further include an operation for arranging a tube housing 165 so that the tube housing 165 may surround a part of the tube 105. The tube housing 165 may be formed of a strong material. The tube housing 165 may be mounted on the flexible display device 103, while surrounding a part of the tube 105.

Figure 5:
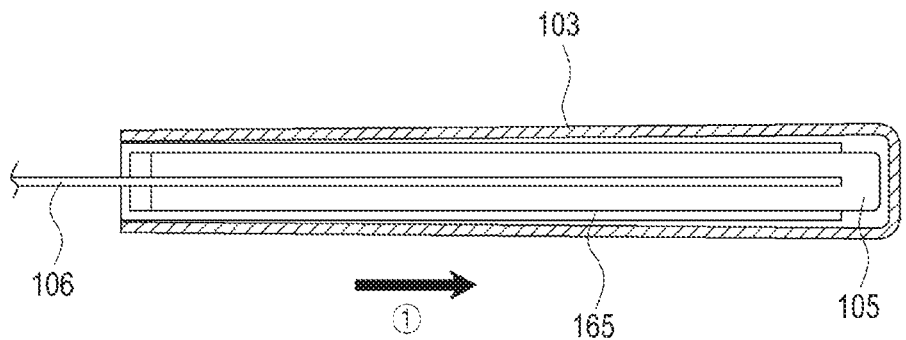
FIG. 5 is a sectional view illustrating an example tube and tube housing surrounded by a flexible display device, the tube and the tube housing forming an apparatus for attaching the flexible display device to an exterior member, in an electronic device according to one of various example embodiments of the present disclosure.

FIG. 5 is a sectional view illustrating an example tube and tube housing at least partially surrounded by a flexible display device, the tube and the tube housing forming an apparatus for attaching the flexible display device to an exterior member, in an electronic device according to one of various example embodiments of the present disclosure.

Referring to FIG. 5, the operation S11 for arranging the tube 105 so that at least a part of the tube 105 may be surrounded by the flexible display device 103 may include an operation for folding the flexible display device 103 to surround the tube 105 and the tube housing 165, after the operation for mounting the tube 105 and the tube housing 165 on the unfolded flexible display device 103.

The other part of the tube 105 (for example, the other part of the tube 105, exposed from the tube housing 165) may be close to a folded part (for example, the second flexible display 133) of the flexible display device 103.

Further, the tube 105 may be provided with a gas injector 106 inserted into the tube 105, for injecting gas into the tube 105. The gas injector 106 may be inserted from a side surface of the tube 105 opposite to the other part of the tube 105. One end of the gas injector 106 may be close to the other part of the tube 105.

Further, according to various example embodiments of the present disclosure, the operation S11 for arranging the tube 105 so that at least a part of the tube 105 may be surrounded by the foldable flexible display device 103 may include an operation for folding the unfolded flexible display device 103, and an operation for arranging the tube 105 and the tube housing 165 so that the tube 105 and the tube housing 165 may be surrounded by the folded flexible display device 103.

Figure 6:
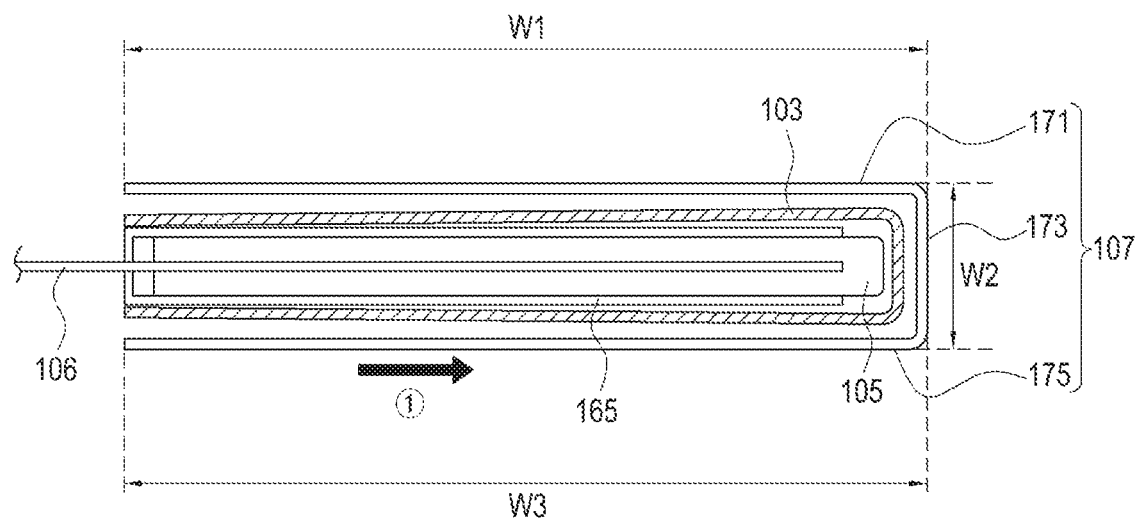
FIG. 6 is a sectional view illustrating an example apparatus for attaching a flexible display device to an exterior member in an electronic device according to one of various example embodiments of the present disclosure.

FIG. 6 is a sectional view illustrating an example apparatus for attaching a flexible display device to an exterior member in an electronic device according to one of various example embodiments of the present disclosure.

Referring to FIG. 6, the exterior member 107 may include a first surface 171, a second surface 173, and a third surface 175. The first surface 171 may form one of the front and rear surfaces of the housing, the second surface may 173 may be extended from the first surface 171, forming a side surface of the housing, and the third surface may 175 may be extended from the second surface 173, forming the other of the front and rear surfaces of the housing. The first and third surfaces 171 and 175 may be parallel to each other. Arrangement of the first and third surfaces 171 and 175 is a parallel arrangement, and the first surface 171 may face the third surface 175. The exterior member 107 may be formed of a strong transparent material. For example, the exterior member 107 may be formed of glass or plastic. As the width W2 of the second surface 173 is smaller than the width W1 of the first surface 171 or the width W3 of the third surface 175, the space between the first surface 171 and the third surface 175 may be narrow. A method for attaching the flexible display device 103 to inner surfaces of the first and second surfaces 171 and 175 by inserting the flexible display device 103 in the space will be described below.

The operation (S13 in FIG. 2) for arranging the folded flexible display device 103 so that at least a part of the folded flexible display device 103 may be surrounded by the folded exterior member 107 is an operation for with the tube 105 and the tube housing 165 arranged surrounded by the flexible display device 103, moving the flexible display device 103 to between inner surfaces of the exterior member 107 in a first direction (①). The first direction (①) may be a direction in which the gas injector 106 is inserted into the tube 165. One end (for example, the flexible display 133 in FIG. 3) of the flexible display device 103 may be arranged close to the side inner surface of the exterior member 107.

Figure 7:
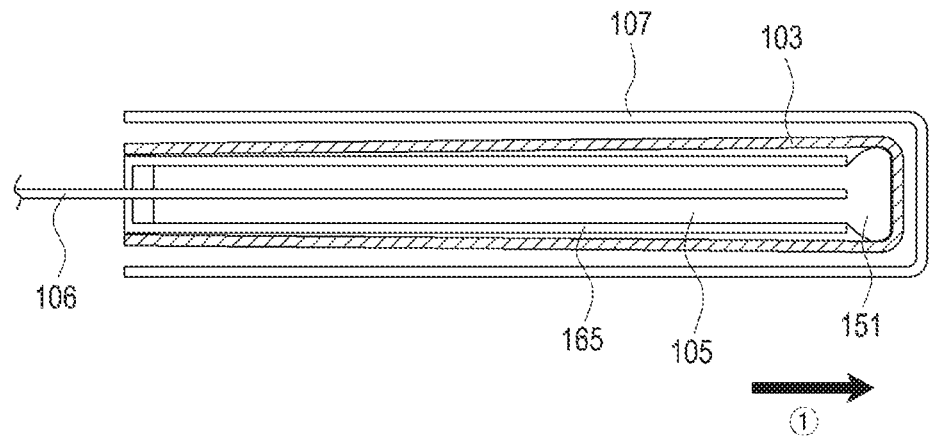
FIG. 7 is a plan view illustrating a part of the tube illustrated in FIG. 6, which is inflated by injecting gas into the tube.

FIG. 7 is a plan view illustrating a part of the tube illustrated in FIG. 6, which is inflated by injecting gas into the tube.

The attachment method (S10 in FIG. 2) may further include an operation for applying an adhesive between the exterior member 107 and the flexible display device 103 before the later-described operation for inflating the tube 105. The adhesive may be, but not limited to, natural resin or synthetic resin. Various other materials with adhesion are available for the adhesive.

Referring to FIG. 7, the operation S15 for inflating the tube 105 by injecting gas into the tube 105 may include an operation for injecting gas in the first direction □ through the gas injector 106 inserted in the tube 105, and an operation for inflating the other part 151 of the tube 105, which is exposed from the tube housing 165.

If the other part 151 of the tube 105 is inflated, the other part 151 may press one end (for example, the second flexible display 133 in FIG. 3) of the display device 103 closely against the inner side surface of the exterior member 107. Even though the tube 105 is partially inflated, the tube housing 165 prevents the inflated part of the tube 105 from pressing the other inner surfaces of the display device 103. Therefore, the one end of the display device 103 may first be brought into close contact with the inner side surface of the exterior member 107.

Figure 8:
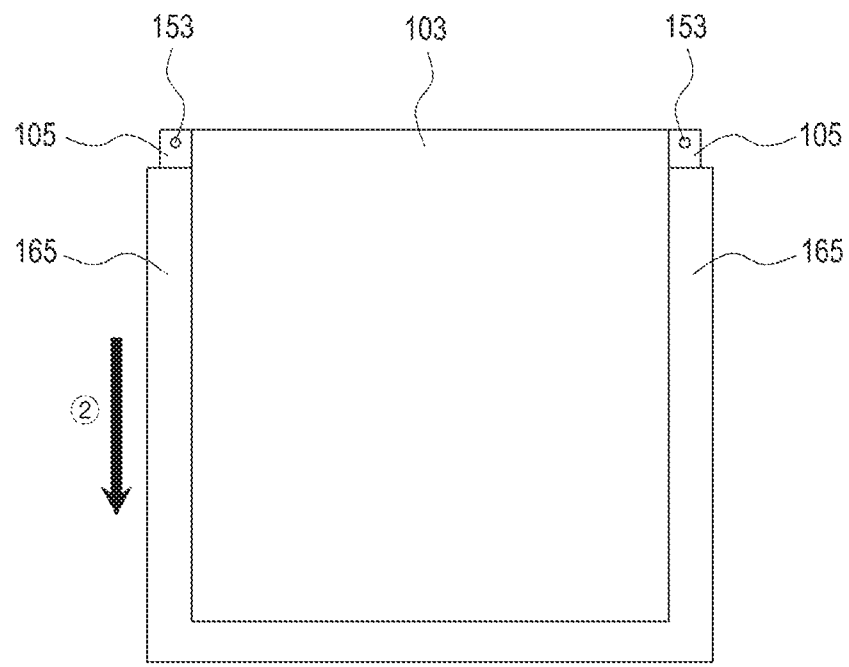
FIG. 8 is a plan view illustrating movement of the tube housing illustrated in FIG. 6 in a direction opposite to a gas injection direction.

FIG. 8 is a plan view illustrating movement of the tube housing illustrated in FIG. 6 in a direction opposite to a gas injection direction.

Referring to FIG. 8, the operation S15 for inflating the tube 105 by injecting gas into the tube 105 may include an operation for moving the tube housing 165 in a direction (②) opposite to the first direction during the gas injection. As the tube housing 165 is moved in the direction (②) opposite to the first direction, the tube 105 gets exposed from the tube housing 165 and inflated, thus pressing the flexible display device 103 closely against the exterior member (107 in FIG. 6). That is, as the tube housing 165 moves in the direction (②) opposite to the first direction in the state where the one end of the display device 103 is in close contact with the inner side surface of the exterior member 107, the flexible display device 103 may be fully in close contact with the exterior member (107 in FIG. 6).

A fixing part 153 connected to an external wire or the like may be formed on the tube 105. The fixing part 153 may be connected to an external wire or the like. Thus, when the tube housing 165 moves, the fixing part 153 may prevent movement of the tube 105 along with the tube housing 165. Accordingly, the tube 105 may bring the flexible display device 103 into close contact with the exterior member (107 in FIG. 6).

Figure 9:
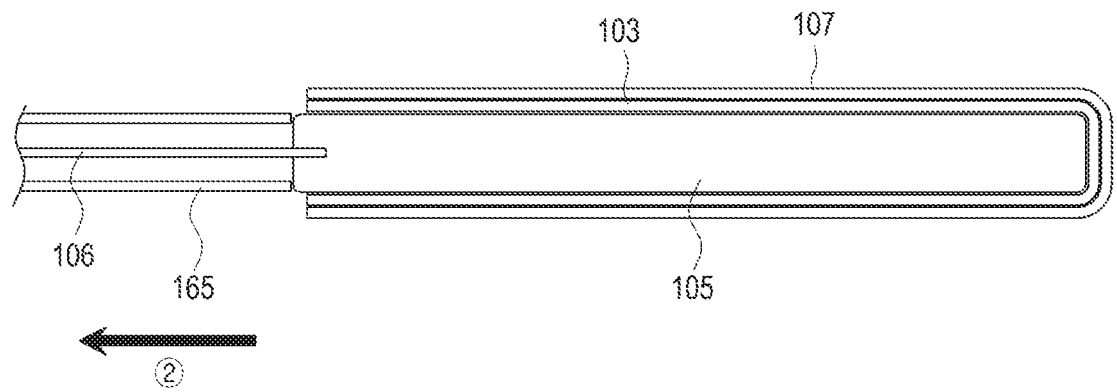
FIG. 9 is a diagram illustrating an example flexible display device from which the tube housing illustrated in FIG. 6 has been removed.

FIG. 9 is a view illustrating a flexible display device from which the tube housing illustrated in FIG. 6 has been removed.

Referring to FIG. 9, the attachment method (S10 in FIG. 2) may further include an operation for removing the tube housing 165 from the tube 105 after the flexible display device 103 is brought into close contact with the exterior member 107.

The gas injector 106 connected to the tube housing 165 may be moved from the tube 105 in the direction (②) opposite to the first direction. Even in the state where the tube housing 165 is removed from the tube 105, the gas injector 106 may be kept inserted into the tube 105.

Also, the attachment method (S10 in FIG. 2) may include an operation for keeping the flexible display device 103 in close contact with the exterior member 107 for a predetermined time after the removal of the tube housing 165 from the tube 105, in the state where the tube 105 is inflated. The predetermined time may be a time period over which the adhesive is hardened between the display device 103 and the exterior member 107. Therefore, the tube 105 inflated for the predetermined time may attach the flexible display device 103 to the exterior member 107.

The attachment method (S10 in FIG. 2) may further include an operation for contracting the tube 105 by discharging the introduced gas from the tube 105 through the gas injector 106, after the flexible display device 103 is attached to the exterior member 107 for the predetermined time. Therefore, the tube 105 may release the display device 103 from a pressed state and thus may be detached from the display device 103.

Finally, the attachment method (S10 in FIG. 2) may further include an operation for removing the tube 105 from between the inner surfaces of the flexible display device 103 after the operation for contracting the tube 105.

Figure 10:
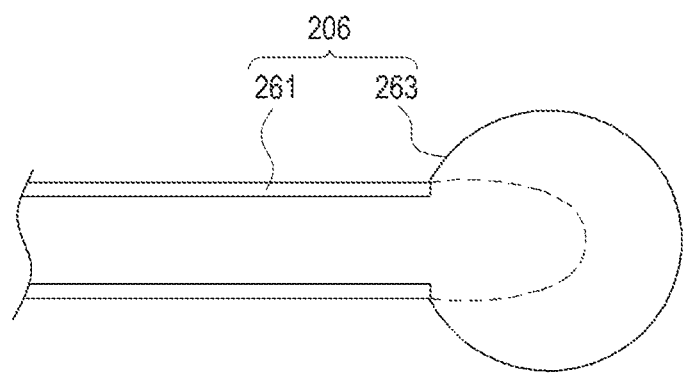
FIG. 10 is a sectional view illustrating an example tube according to various example embodiments of the present disclosure.
Figure 11:
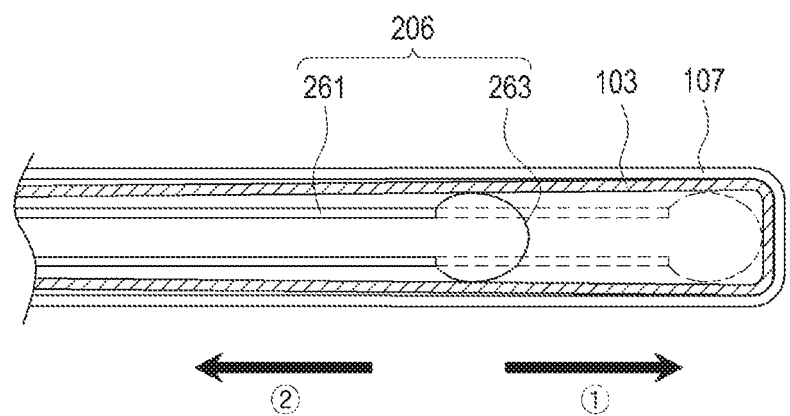
FIG. 11 is a sectional view illustrating example attachment of a display device to an exterior member in an electronic device according to another example embodiment of the present disclosure.

FIG. 10 is a sectional view illustrating an example tube according to various example embodiments of the present disclosure, and FIG. 11 is a sectional view illustrating attachment of a display device to an exterior member in an electronic device according to another of various example embodiments of the present disclosure.

Referring to FIGS. 10 and 11, a tube 206 according to various embodiments of the present disclosure may include a first tube 261 formed of a strong material and a second tube 263 extended from the first tube 261. The first tube 261 may provide a path in which gas is inserted into the second tube 263 from the outside. As the gas is introduced, the second tube 263 may be inflated. The second tube 263 may be formed of rubber. However, the second tube 263 may be formed of various other elastic materials, not limited to rubber.

To attach the flexible display device 103 to the exterior member 107, the flexible display device 103 may be folded and then moved to between inner surfaces of the exterior member 107. The tube 206 may move to between the inner surfaces of the flexible display device 103 in the first direction (①). When the second tube 263 gets close to an inner side surface of the flexible display device 103, gas may be injected into the second tube 263 through the first tube 261. As the second tube 263 is inflated with the introduced gas, a side surface of the flexible display device 103 may be brought into close contact with the inner side surface (for example, the second surface) of the exterior member 107. After the side surface of the flexible display device 103 is attached to the inner side surface of the exterior member 107, the tube 206 may be moved in the second direction (②), thereby attaching the inner surfaces of the flexible display device 103 to inner surfaces (for example, the first and second surfaces) of the exterior member 107. A speed at which the tube 206 is moved in the second direction (②) may be controlled in consideration of a hardening speed of the adhesive between the flexible display device 103 and the exterior member 107.

As described above, according to various embodiments of the present disclosure, a method for attaching a display device to an exterior member in an electronic device may include arranging a tube to be at least partially surrounded by a foldable flexible display device, arranging the flexible display device to be at least partially surrounded by the exterior member, the flexible display device and the exterior member being folded, and inflating the tube by injecting gas into the tube. The flexible display device may be attached to inner surfaces of the exterior member by the inflation of the tube.

According to various example embodiments of the present disclosure, the arrangement of a tube to be at least partially surrounded by a foldable flexible display device may include arranging the tube on the flexible display device, in a state where the flexible display device is unfolded, and folding the flexible display device to surround the tube.

According to various example embodiments of the present disclosure, the arrangement of a tube to be at least partially surrounded by a foldable flexible display device may include folding the flexible display device, in a state where the flexible display device is unfolded, and arranging the tube to be at least partially surrounded by the folded flexible display device.

According to various example embodiments of the present disclosure, the method may further include applying an adhesive between the exterior member and the flexible display device, before inflating the tube.

According to various example embodiments of the present disclosure, the method may further include arranging a tube housing surrounding a part of the tube, before inflating the tube.

According to various example embodiments of the present disclosure, the inflation of the tube may include injecting the gas in a first direction through a gas injector inserted in the tube, inflating the other part of the tube exposed from the tube housing, and moving the tube housing in a direction opposite to the first direction.

According to various example embodiments of the present disclosure, as the tube housing is moved in the direction opposite to the first direction during the gas injection, the tube may be exposed further from the tube housing and inflated, pressing the flexible display device into close contact with the exterior member.

According to various example embodiments of the present disclosure, the method may further include removing the tube housing from the tube, after closely contacting the flexible display device with the exterior member.

According to various example embodiments of the present disclosure, the method may further include, with the tube inflated, keeping the flexible display device in close contact with the exterior member for a predetermined time after the tube housing is removed from the tube.

According to various example embodiments of the present disclosure, the method may further include contracting the tube by discharging the gas introduced in the tube through the gas injector, after the flexible display device is in close contact with the exterior member for the predetermined time.

According to various example embodiments of the present disclosure, the method may further include removing the tube from between inner surfaces of the flexible display device, after the tube is contracted.

According to various example embodiments of the present disclosure, an apparatus for attaching a display device to an exterior member in an electronic device may include a tube arranged to be at least partially surrounded by a folded flexible display device, and a tube injector inserted in the tube, for injecting gas into the tube. The flexible display device may be attached to inner surfaces of the exterior member by injecting the gas into the tube through the gas injector, in a state where the flexible display device is inserted between inner surfaces of the exterior member which is folded.

According to various example embodiments of the present disclosure, the apparatus may further include a tube housing surrounding a part of the tube. As the tube housing is moved in a direction opposite to a gas injection direction during the gas injection, the tube may be exposed further from the tube housing and inflated, pressing the flexible display device into close contact with the exterior member.

According to various example embodiments of the present disclosure, the apparatus may further include a fixing part formed on the tube. When the tube housing is moved, the fixing part may prevent the tube from moving along with the tube housing.

According to various example embodiments of the present disclosure, the tube may include a first tube formed of a strong material, and a second tube extended from the first tube, for being inflated by injecting the gas. While the second tube is moved in a direction opposite to a gas injection direction, the second tube may press the flexible display device into close contact with the exterior member.

According to various example embodiments of the present disclosure, an electronic device may include an exterior member including a first surface, a second surface extended from the first surface, and a third surface extended from the second surface, and a flexible display device attached to inner surfaces of the first, second, and third surfaces. A width of the second surface may be smaller than a width of the first surface or a width of the third surface.

According to various example embodiments of the present disclosure, the first surface and the second surface may be arranged in parallel.

According to various example embodiments of the present disclosure, the exterior member may be formed of a strong material.

According to various example embodiments of the present disclosure, the exterior member may be formed of glass or reinforced plastic.

As is apparent from the foregoing description, in the method for attaching a display device to an exterior member in an electronic device according to various example embodiments of the present disclosure, a folded flexible display device is inserted between inner surfaces of a three-dimensional exterior member and then gas is injected into a tube inserted between inner surfaces of the folded flexible display device. As the tube is inflated with the introduced gas, the flexible display device can be attached to the inner surfaces of the exterior member.

While the disclosure has been illustrated and described with reference to certain example embodiments thereof, it will be understood by those skilled in the art that various changes in form and details may be made therein without departing from the spirit and scope of the disclosure as defined by the appended claims and their equivalents.

What is claimed is:

1. An electronic device comprising:
a foldable flexible display device configured to surround at least part of a tube which is able to be inflated by injecting a gas into the tube,
an exterior member configured to surround at least part of the flexible display device,
an adhesive provided between the exterior member and the flexible display device, before inflating the tube,
wherein the flexible display device and the exterior member is configured to be folded, ad
wherein the tube is configured to be removed from a space which is formed by inner surfaces of the flexible display device, after the tube is inflated, and
wherein the flexible display device is configured to be attached to inner surfaces of the exterior member by the inflation of the tube.

2. The electronic device of claim 1, further comprising a tube housing arranged to surround at least a part of the tube, before inflating the tube.

3. The electronic device of claim 2, wherein as the tube housing is moved in the direction opposite to the first direction during the gas injection, the tube is exposed further from the tube housing and inflated, causing the flexible display device be pressed into close contact with the exterior member.

4. The electronic device of claim 1,
wherein the exterior member includes a first surface, a second surface extended from the first surface, and a third surface extended from the second surface; and
wherein the flexible display device is attached to inner surfaces of the first, second, and third surfaces,
wherein a width of the second surface is less than a width of the first surface and a width of the third surface.

5. The electronic device of claim 4, wherein the first surface and the second surface are arranged in parallel.

6. The electronic device of claim 5, wherein the exterior member is formed of glass or reinforced plastic.

7. The electronic device of claim 6, wherein the exterior member comprises reinforced plastic.

* * * * *